United States Patent
Bjornson et al.

(10) Patent No.: US 8,096,425 B2
(45) Date of Patent: Jan. 17, 2012

(54) SYSTEM, APPARATUS AND PROCESS FOR EXTRACTION OF BITUMEN FROM OIL SANDS

(75) Inventors: Bradford E. Bjornson, Lethbridge (CA); Craig Aaron Strand, Fort McMurray (CA); William Nicholas Garner, Fort McMurray (CA); John Khai-Quang Diep, Burnaby (CA); Darwin Edward Kiel, New Westminster (CA); Thomas Charles Hann, Onoway (CA)

(73) Assignee: Suncor Energy Inc., Calgary, Alberta (CA)

( * ) Notice: Subject to any disclaimer, the term of this patent is extended or adjusted under 35 U.S.C. 154(b) by 76 days.

(21) Appl. No.: 11/595,817

(22) Filed: Nov. 9, 2006

(65) Prior Publication Data

US 2007/0187321 A1    Aug. 16, 2007

(30) Foreign Application Priority Data

Nov. 9, 2005   (CA) ...................................... 2526336

(51) Int. Cl.
   *B01D 21/26* (2006.01)
(52) U.S. Cl. .................. 210/512.2; 210/532.1; 210/538; 210/540; 210/521; 210/528; 210/800; 210/801; 210/202; 210/137; 210/788; 210/803; 210/802; 208/425
(58) Field of Classification Search ............... 210/512.1, 210/512.2, 512.3, 202, 521, 532.1, 534, 538, 210/540, 800–803, 137, 788, 528, 513, 519, 210/419, 523, 533, 536; 208/390, 391, 425, 208/426, 428; 209/12.1, 727, 729, 164, 168
See application file for complete search history.

(56) References Cited

U.S. PATENT DOCUMENTS

| | | | | | |
|---|---|---|---|---|---|
| 1,431,367 | A | * | 10/1922 | Buchi | 210/532.1 |
| 2,910,424 | A | * | 10/1959 | Tek et al. | 208/391 |
| 3,419,145 | A | * | 12/1968 | De Celts | 210/802 |

(Continued)

FOREIGN PATENT DOCUMENTS

CA        518320        11/1955

(Continued)

OTHER PUBLICATIONS

Definition of "lateral", Merriam-Webster Online Dictionary, Accessed Mar. 10, 2011, pp. 1-3.*

(Continued)

*Primary Examiner* — Tony G Soohoo
*Assistant Examiner* — David C Mellon
(74) *Attorney, Agent, or Firm* — Knobbe, Martens, Olson & Bear, LLP

(57) ABSTRACT

An extraction system and process for extracting bitumen from a slurry containing bitumen, solids and water. The system comprises a cyclone separation facility for separating the slurry into a solids component stream and a bitumen froth stream with the bitumen froth stream including water and fine solids. The bitumen froth stream is then delivered to a froth concentration facility for separating the bitumen froth stream into a final bitumen enriched froth stream, and a water and fine solids stream. The final bitumen enriched froth stream is suitable for further processing. The system of the present invention is preferably mobile so that the cyclone extraction facility and the froth concentration facility can move with the mine face at an oil sands mining site, however, it is also contemplated that the system can be retrofitted to existing fixed treatment facilities to improve the operational efficiency of such fixed facilities.

40 Claims, 8 Drawing Sheets

U.S. PATENT DOCUMENTS

| | | | |
|---|---|---|---|
| 3,607,720 A | 9/1971 | Paulson | |
| 3,808,120 A | 4/1974 | Smith | |
| 3,956,417 A | 5/1976 | Franz et al. | |
| 3,962,070 A | 6/1976 | Stotler | |
| 3,971,718 A | 7/1976 | Reid | |
| 3,972,861 A | 8/1976 | Gardner, Jr. et al. | |
| 4,017,263 A | 4/1977 | Holmes et al. | |
| 4,035,282 A | 7/1977 | Stuchberry et al. | |
| 4,036,664 A | 7/1977 | Priebe | |
| 4,072,609 A | 2/1978 | Kizior | |
| 4,090,943 A | 5/1978 | Moll et al. | |
| 4,139,646 A | 2/1979 | Gastrock | |
| 4,146,534 A | 3/1979 | Armstrong | |
| 4,216,085 A * | 8/1980 | Chittenden | 210/703 |
| 4,216,796 A | 8/1980 | Gastrock | |
| 4,279,743 A | 7/1981 | Miller | |
| 4,337,143 A | 6/1982 | Hanson et al. | |
| 4,383,914 A | 5/1983 | Kizior | |
| 4,397,741 A | 8/1983 | Miller | |
| 4,399,027 A | 8/1983 | Miller | |
| 4,514,305 A | 4/1985 | Filby | |
| 4,545,892 A | 10/1985 | Cymbalisty et al. | |
| 4,556,422 A | 12/1985 | Reynolds et al. | |
| 4,581,142 A | 4/1986 | Fladby et al. | |
| 4,604,988 A | 8/1986 | Rao | |
| 4,744,890 A | 5/1988 | Miller et al. | |
| 4,838,434 A | 6/1989 | Miller et al. | |
| 4,851,123 A | 7/1989 | Mishra | |
| 4,859,317 A | 8/1989 | Shelfantook et al. | |
| 4,914,017 A | 4/1990 | Mifune | |
| 4,994,097 A | 2/1991 | Brouwers | |
| 5,032,275 A | 7/1991 | Thew | |
| 5,035,910 A | 7/1991 | Jones | |
| 5,037,558 A | 8/1991 | Kalnins | |
| 5,055,202 A | 10/1991 | Carroll et al. | |
| 5,062,955 A | 11/1991 | Sciamanna | |
| 5,066,407 A * | 11/1991 | Furlow | 210/744 |
| 5,071,556 A | 12/1991 | Kalnins et al. | |
| 5,071,557 A | 12/1991 | Schubert et al. | |
| 5,073,177 A | 12/1991 | Brouwers | |
| 5,090,498 A | 2/1992 | Hamill | |
| 5,110,471 A | 5/1992 | Kalnins | |
| 5,118,408 A | 6/1992 | Jansen et al. | |
| 5,143,598 A | 9/1992 | Graham et al. | |
| 5,207,805 A | 5/1993 | Kalen et al. | |
| 5,223,148 A | 6/1993 | Tipman et al. | |
| 5,242,580 A | 9/1993 | Sury | |
| 5,242,604 A | 9/1993 | Young et al. | |
| 5,264,118 A | 11/1993 | Cymerman et al. | |
| 5,302,294 A | 4/1994 | Schubert et al. | |
| 5,316,664 A | 5/1994 | Gregoli et al. | |
| 5,340,467 A | 8/1994 | Gregoli et al. | |
| 5,350,525 A | 9/1994 | Shaw et al. | |
| 5,458,770 A * | 10/1995 | Fentz | 210/167.06 |
| 5,538,631 A * | 7/1996 | Yeh | 210/221.2 |
| 5,554,301 A | 9/1996 | Rippetoe et al. | |
| 5,556,545 A | 9/1996 | Volchek et al. | |
| 5,620,594 A | 4/1997 | Smith et al. | |
| 5,667,543 A | 9/1997 | Brouwers | |
| 5,667,686 A | 9/1997 | Schubert | |
| 5,711,374 A | 1/1998 | Kjos | |
| 5,740,834 A | 4/1998 | Sherowski | |
| 5,766,484 A * | 6/1998 | Petit et al. | 210/703 |
| 5,840,198 A | 11/1998 | Clarke | |
| 5,879,541 A | 3/1999 | Parkinson | |
| 5,958,256 A | 9/1999 | Ocel, Jr. et al. | |
| 5,965,023 A * | 10/1999 | Schaller | 210/540 |
| 5,996,690 A | 12/1999 | Shaw et al. | |
| 6,077,433 A | 6/2000 | Brun Henriksen et al. | |
| 6,119,870 A | 9/2000 | Maciejewski et al. | |
| 6,189,613 B1 | 2/2001 | Chachula et al. | |
| 6,197,095 B1 | 3/2001 | Ditria et al. | |
| 6,213,208 B1 | 4/2001 | Skilbeck | |
| 6,322,845 B1 | 11/2001 | Dunlow | |
| 6,346,069 B1 | 2/2002 | Collier | |
| 6,378,608 B1 | 4/2002 | Nilsen et al. | |
| 6,398,973 B1 | 6/2002 | Saunder et al. | |
| 6,468,330 B1 | 10/2002 | Irving et al. | |
| 6,543,537 B1 | 4/2003 | Kjos | |
| 6,596,170 B2 | 7/2003 | Tuszko et al. | |
| 6,607,437 B2 | 8/2003 | Casey et al. | |
| 6,702,877 B1 | 3/2004 | Swanborn | |
| 6,719,681 B2 | 4/2004 | Collier | |
| 6,730,236 B2 | 5/2004 | Kouba | |
| 6,800,116 B2 | 10/2004 | Stevens et al. | |
| 6,800,208 B2 | 10/2004 | Bolman | |
| 7,011,219 B2 | 3/2006 | Knox-Holmes et al. | |
| 7,060,017 B2 | 6/2006 | Collier | |
| 7,128,375 B2 * | 10/2006 | Watson | 299/8 |
| 2001/0005986 A1 | 7/2001 | Matsubara et al. | |
| 2001/0042713 A1 | 11/2001 | Conrad et al. | |
| 2002/0018842 A1 | 2/2002 | Dunlow | |
| 2002/0068673 A1 | 6/2002 | Collier | |
| 2002/0068676 A1 | 6/2002 | Collier | |
| 2002/0148777 A1 | 10/2002 | Tuszko | |
| 2003/0085185 A1 | 5/2003 | Kouba | |
| 2003/0168391 A1 | 9/2003 | Tveiten | |
| 2004/0055972 A1 | 3/2004 | Garner et al. | |
| 2004/0069705 A1 | 4/2004 | Tuszko et al. | |
| 2004/0094456 A1 | 5/2004 | Dries | |
| 2004/0140099 A1 | 7/2004 | Hauge et al. | |
| 2004/0182754 A1 | 9/2004 | Lange | |
| 2004/0192533 A1 | 9/2004 | Collier | |
| 2004/0262980 A1 * | 12/2004 | Watson | 299/8 |
| 2005/0016904 A1 | 1/2005 | Knox-Holmes et al. | |
| 2006/0112724 A1 | 6/2006 | Chang et al. | |
| 2006/0122449 A1 | 6/2006 | van Egmond | |
| 2006/0138036 A1 | 6/2006 | Garner et al. | |
| 2006/0138055 A1 | 6/2006 | Garnet et al. | |

FOREIGN PATENT DOCUMENTS

| | | |
|---|---|---|
| CA | 970308 | 7/1975 |
| CA | 1026252 | 2/1978 |
| CA | 1059052 | 7/1979 |
| CA | 1066644 | 11/1979 |
| CA | 1072473 | 2/1980 |
| CA | 1097574 | 3/1981 |
| CA | 1126187 | 6/1982 |
| CA | 1138822 | 4/1983 |
| CA | 1194622 | 1/1985 |
| CA | 1201412 | 3/1986 |
| CA | 1254171 | 5/1989 |
| CA | 1267860 | 4/1990 |
| CA | 2000984 | 4/1991 |
| CA | 2037856 | 9/1991 |
| CA | 1283465 | 12/1991 |
| CA | 2024756 | 5/1992 |
| CA | 1305390 | 7/1992 |
| CA | 2058221 | 7/1992 |
| CA | 1318273 | 5/1993 |
| CA | 1322177 | 9/1993 |
| CA | 1325180 | 12/1993 |
| CA | 2088227 | 4/1994 |
| CA | 2108521 | 4/1994 |
| CA | 2086073 | 6/1994 |
| CA | 2155198 | 8/1994 |
| CA | 2184613 | 11/1995 |
| CA | 2180686 | 2/1997 |
| CA | 2231543 | 3/1997 |
| CA | 2263691 | 3/1998 |
| CA | 2249679 | 4/1999 |
| CA | 2308410 | 5/1999 |
| CA | 2236183 | 10/1999 |
| CA | 2246841 | 3/2000 |
| CA | 2365008 | 8/2000 |
| CA | 2298122 | 7/2001 |
| CA | 2090618 | 10/2001 |
| CA | 2358805 | 10/2001 |
| CA | 2311738 | 11/2001 |
| CA | 2409129 | 11/2001 |
| CA | 2311596 | 2/2002 |
| CA | 2332207 | 2/2002 |
| CA | 857306 | 3/2002 |
| CA | 873854 | 3/2002 |
| CA | 882667 | 3/2002 |
| CA | 910271 | 3/2002 |
| CA | 2217300 | 8/2002 |

| | | |
|---|---|---|
| CA | 2419325 | 8/2003 |
| CA | 2435113 | 1/2005 |
| CA | 2436158 | 1/2005 |
| CA | 2439436 | 3/2005 |
| CA | 2532737 | 3/2005 |
| CA | 2535702 | 3/2005 |
| CA | 2537603 | 3/2005 |
| CA | 2483896 | 4/2005 |
| CA | 2493677 | 6/2005 |
| CA | 2549895 | 6/2005 |
| CA | 2554725 | 6/2005 |
| CA | 2454942 | 7/2005 |
| CA | 2455623 | 7/2005 |
| CA | 2462359 | 9/2005 |
| CA | 2558424 | 10/2005 |
| CA | 2467372 | 11/2005 |
| CA | 2565980 | 12/2005 |
| CA | 2510099 | 1/2006 |
| CA | 2517811 | 2/2006 |
| CA | 2538464 | 2/2006 |
| CA | 2563922 | 3/2006 |
| CA | 2520943 | 4/2006 |
| CA | 2522031 | 4/2006 |
| CA | 2580836 | 4/2006 |
| CA | 2582078 | 4/2006 |
| CA | 2506398 | 5/2006 |
| CA | 2587866 | 6/2006 |
| CA | 2494391 | 7/2006 |
| CN | 1112033 | 11/1995 |
| CN | 2263552 Y | 10/1997 |
| CN | 2520942 Y | 11/2002 |
| CN | 1701856 | 11/2005 |
| EP | 262916 | 6/1988 |
| EP | 355127 | 6/1989 |
| EP | 332641 | 3/1994 |
| EP | 605746 | 7/1994 |
| EP | 1600215 | 11/2005 |
| EP | 1501636 | 8/2006 |
| GB | 195055 | 1/1924 |
| GB | 726841 | 3/1955 |
| GB | 814610 | 6/1959 |
| GB | 1302064 | 1/1973 |
| GB | 2047735 | 1/1980 |
| GB | 2075543 | 11/1981 |
| GB | 2088234 A * | 6/1982 |
| GB | 2116447 | 9/1983 |
| JP | 61082856 | 4/1986 |
| WO | WO 94/23823 | 10/1994 |
| WO | WO 00/74815 | 12/2000 |
| WO | WO 03/068407 | 8/2003 |
| WO | WO 03/092901 | 11/2003 |
| WO | WO 2004/005673 | 1/2004 |
| WO | WO 2005/044871 | 5/2005 |
| WO | WO 2006/085759 | 8/2006 |

OTHER PUBLICATIONS

Related pending U.S. Appl. No. 11/360,597, filed Feb. 24, 2006. Title: Bituminous Froth Hydrocarbon Cyclone. Inventors: Garner et al.

Related pending U.S. Appl. No. 11/360,489, filed Feb. 24, 2006. Title: Bituminous Froth Inclined Plate Separator and Hydrocarbon Cyclone Treatment Process. Inventors: Garner et al.

Related pending U.S. Appl. No. 11/486,302, filed Jul. 13, 2006. Title: Bituminous Froth Inclined Plate Separator and Hydrocarbon Cyclone Treatment Process. Inventors: Garner et al.

Related pending U.S. Appl. No. 11/759,151, filed Jun. 6, 2007. Title: System and Process for Concentrating Hydrocarbons in a Bitumen Feed. Inventors: Garner et al.

Rimmer, et al. "Hydrocyclone-Based Process for Rejecting Solids from Oil Sands at the Mine Site while Retaining Bitumen Transportation to a Processing Plant"; paper delivered on Monday Apr. 5, 1993 at a conference in Alberta, Canada entitled "Oil Sands-Our Petroleum Future.".

National Energy Board, Canada's Oil Sands: A Supply and Market Outlook to 2015, An Energy Market Assessment Oct. 2000.

Krebs' Engineers, Krebs D-Series gMAX DeSanders for Oil and Gas, Bulletin 11-203WEL.

Eva Mondt "Compact Centrifugal Separator of Dispersed Phases" Proefschrift, 2005.

Natural Resources Canada, Treatment of Bitumen Froth and Slop Oil Tailings.

Restriction Requirement dated Feb. 24, 2011 for U.S. Appl. No. 11/938,226.

Office Action dated Jul. 28, 2011 for U.S. Appl. No. 11/938,226.

* cited by examiner

SYSTEM, APPARATUS AND PROCESS FOR EXTRACTION OF BITUMEN FROM OIL SANDS

FIELD OF THE INVENTION

This invention relates to systems and methods for extracting hydrocarbons from a mixture that includes solids and water. More particularly, the invention relates to a system and method for extracting bitumen from a hydro-transport slurry created to facilitate movement of bitumen contained in oil sands from a mining site to a processing site.

BACKGROUND OF THE INVENTION

Oil sands, also referred to as tar sands or bituminous sands, are a combination of solids (generally mineral components such as clay, silt and sand), water, and bitumen. Although the term "sand" is commonly used to refer to the mineral components of the mixture, it is well known that this term is meant to include various other components such as clay and silts. Technically speaking, the bitumen is neither oil nor tar, but a semisolid form of oil which will not flow toward producing wells under normal conditions, making it difficult and expensive to produce. Oil sands are mined to extract the oil-like bitumen which is processed further at specialized refineries. Conventional oil is extracted by drilling traditional wells into the ground whereas oil sand deposits are mined using strip mining techniques or persuaded to flow into producing wells by techniques such as steam assisted gravity drainage (SAGD) or cyclic steam stimulation (CSS) which reduce the bitumen's viscosity with steam and/or solvents.

Various methods and equipment have been developed over many years for mining oil sands and for extracting desired hydrocarbon content from the mined solids.

Conventional oil sand extraction processes involve the following steps:
a) Excavation of the oil sand from a mine face as a volume of ore material. Generally, this is done using conventional strip mining techniques and equipment.
b) Comminution of the ore material to reduce it to conveyable size for conveying from the mine face.
c) Combining the comminuted material with water to form a slurry. Generally, the slurry is formed with hot water, and, optionally other additives.
d) Pumping the slurry to a primary separation facility to separate the mineral from the hydrocarbon components. The pumping step is generally referred to as a "hydro-transport" process. During the slurry formation and hydro-transport process, large constituents in the ore material are further reduced in size, or ablated, and the process of bitumen separation from the solid mineral components is commenced. These effects are referred to as "conditioning" of the slurry.
e) Separating the bulk of the hydrocarbon (i.e. bitumen) content from the mineral component in one or more "primary separation vessels" (PSV) wherein the bitumen portion is entrained in a froth that is drawn off from the surface of the slurry while a significant portion of the mineral is removed as a solids or tailings stream.
f) Hydraulic transport of the tailings to a designated tailings disposal site.
g) Recovery and recycling of clarified water back to the process when released from the tailings slurry within the tailings disposal site.

The above separation and froth concentration steps constitute initial primary extraction of the oil sands to separate the bitumen from the mineral component. The bitumen froth that results after application of the above steps is then delivered to secondary treatment steps that further concentrate and upgrade the bitumen to produce a suitable feed for upgrading to synthetic crude oil or for refining into petroleum products.

Various other intervening steps are also known in the primary extraction process such as withdrawal of a middlings layer from the PSV to further increase the yield of bitumen from the ore material.

As will be known to persons skilled in the art, the large-scale nature of oil sands mining requires processing facilities of an immense size. As such, these facilities are generally fixed in position. For this reason, transport of the ore material between the various above-mentioned steps generally involves the use of trucks, conveyors, or pipelines or various other known equipment. However, as operations continue, it will be appreciated that the mine face normally recedes further away from the permanent facilities. This, therefore, increases the transport distances and time resulting in increased operating and maintenance costs and environmental impact.

There exists therefore a need to increase the efficiency of at least the transport and primary extraction processes to reduce operating costs. One suggestion that has been proposed is for having one or more of the excavating equipment to be mobile so as to follow the receding mine face. An example of this method is taught in Canadian application number 2,453,697, wherein the excavating and crushing equipment is made mobile so as to advance along with the mine face. The crushed ore is then deposited onto a conveyor, which then transports the ore to a separation facility. This reference also teaches that the conveyor and separation facility can periodically be relocated to a different site once the mine face advances a sufficient distance. However, such relocation would involve considerable time, expense and lost production.

Another problem faced with respect to oil sand mining involves the fact that sand constitutes the primary weight fraction of the mineral component of the mined ore material. Thus, it is desirable to separate the minerals as soon as possible "upstream" so as to minimize transport costs. In addition, the transport of mineral components results in considerable wear on the transport mechanisms, which further increases operating and maintenance costs. At the same time, separation of the bitumen and mineral components must be done in such a way as to maximize bitumen yield from the ore material.

Thus, there exists a need for an efficient primary extraction process to separate bitumen from the mineral components, preferably in proximity to the mine face to reduce transport costs. The present invention seeks to alleviate at least some of the problems associated with the prior art by providing a novel system and method for extracting the bitumen from a hydro-transport slurry to create an intermediate bitumen froth suitable for further processing. The system of the present invention is preferably mobile so that the primary extraction process can move with the mine face, however, it is also contemplated that the system can be retrofitted to existing fixed primary treatment facilities to improve the operational efficiency of such fixed facilities.

SUMMARY OF THE INVENTION

Accordingly, the present invention provides an extraction system for extracting bitumen from a slurry containing bitumen, solids and water comprising:

a cyclone separation facility for separating the slurry into a solids component stream and a bitumen froth stream, the bitumen froth stream including bitumen, water and fine solids; and a froth concentration facility for separating the bitumen froth stream into a final bitumen enriched froth stream, and a water and fine solids stream.

The present invention also provides a process for extracting bitumen from a slurry containing bitumen, solids and water comprising:

separating the slurry into a solids component stream and a bitumen froth stream; and separating the bitumen froth stream into a final bitumen froth stream and a water and fine solids stream.

In a further aspect, the present invention provides a concentrator vessel for separating a bitumen froth stream containing bitumen froth, water and fine solids into a final bitumen enriched froth stream and a water and fine solids stream, the concentrator vessel comprising:

an inlet region to receive the bitumen froth stream;

a separation region in communication with the inlet region comprising a diverging channel adapted to slow the flow of the bitumen froth stream to promote separation of the bitumen froth from the water and fine solids, the bitumen froth accumulating as a froth layer atop a water layer with the fine solids settling within the water layer; and a froth recovery region in communication with the separation region having an overflow outlet to collect the bitumen froth layer as the bitumen enriched froth stream, and an underflow outlet to collect the water and fine solids as the water and fine solids stream.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
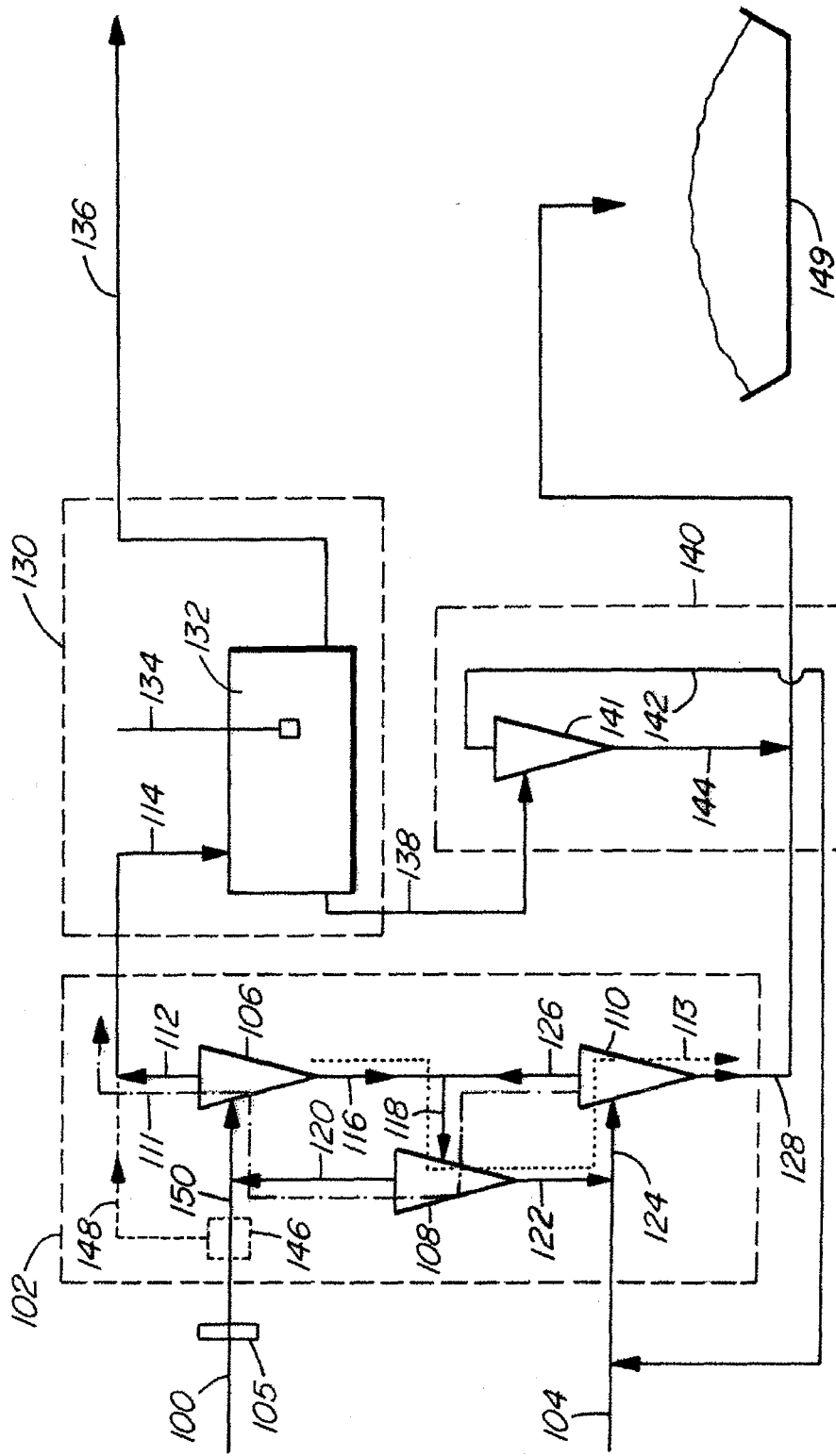
FIG. 1 is a flow diagram showing a preferred embodiment of the system of the present invention for extracting bitumen from a slurry containing bitumen, solids, and water.

Referring to FIG. 1, there is shown a flow diagram of an extraction system according to an aspect of the present invention for extracting bitumen from a slurry that includes bitumen, solids and water. This slurry may be created by conventional techniques or by other techniques such as the mobile oil sand excavation and processing system and process described in applicant's co-pending Canadian patent application no. 2,526,336 filed on Nov. 9, 2005 and entitled METHOD AND APPARATUS FOR OIL SANDS ORE MINING. This mobile oil sand excavation and processing system is capable of excavating, comminuting or crushing, and slurrifying oil sand ore and moving with the mine face. In a preferred arrangement, the system and process illustrated in FIG. 1 are designed to be mobile for movement with the mine face and the excavation and ore processing system, however, the present system can also be retrofitted to existing fixed froth treatment facilities to improve the operational efficiency of such fixed facilities.

Initially, the system of FIG. 1 includes a cyclone separation facility 102, also referred to as a de-sanding or, more accurately, a de-mineralizing facility for treatment of incoming slurry 100. The cyclone separation facility 102 comprises a plurality of hydrocyclones which aid in de-mineralizing slurry 100. A water feed 104 is also provided to the cyclone separation facility 102 as a water wash to the slurry flow. The cyclone separation facility 102 serves to efficiently separate a large portion of the solids component from the bitumen component, producing a bitumen rich froth 114, while a large portion of the solids component is separated as a tailings stream 128 from the separation facility 102.

The solids or mineral component of the incoming slurry 100 is a significant portion, by weight, of the excavated ore from the mine site. By way of example, incoming slurry 100 can have a composition within the following ranges: about 5-15% bitumen by weight, about 40-70% solids (minerals) by weight and about 30-75% water by weight. In a typical slurry, the composition will be in the range of about 7-10% bitumen by weight, about 55-60% minerals by weight, and about 35% water by weight. Thus, in order to increase the efficiency of the oil sands strip mining system, removal of much of the solids component (minerals excluding bitumen) is preferentially conducted as close to the mine face as possible. This avoids unnecessary transport of the solids component thereby avoiding the operation and equipment maintenance costs associated with such transport.

In one embodiment, cyclone separation facility 102 includes three cyclone separation stages 106, 108 and 110 that are connected in series and, more preferably, in a countercurrent arrangement (as discussed below). The cyclone separation stages of each comprise one or more hydrocyclones that are generally vertical units, which have a minimal footprint, thereby occupying a minimal area. This can be particularly desirable in relation to those embodiments of the present invention which are directed to a mobile cyclone separation facility. Suitable hydrocyclones for the cyclone separation stages include those manufactured by Krebs Engineers under the trademark gMAX®, although any hydrocyclone capable of separating a significant amount of the solids component from a bitumen based slurry will do. The slurry 100 (including the bitumen and solid components of the ore) is fed to the first cyclone separation stage 106 wherein a first separation of the bitumen froth and solids is conducted in a conventional manner. Optionally, the slurry 100 is processed by a screening and/or comminuting unit 105 before entering the first cyclone separation stage 106 to ensure that solid particles in the slurry can be handled by the cyclone. Rejected solid particles can either be discarded after screening or made smaller by crushing or other suitable techniques. An exemplary sizing roller screen for carrying out the screening and re-sizing process is disclosed in commonly owned co-pending Canadian Patent application no. 2,476,194 filed Jul. 30, 2004 and entitled SIZING ROLLER SCREEN ORE PROCESSING APPARATUS. In the first cyclone separation stage 106, slurry 100 is processed in a conventional manner to produce a first bitumen froth 112, and a first solid tailings stream 116 which comprises significantly less bitumen and substantially more solids than found in the first bitumen froth 112. Bitumen froth 112 is delivered to the bitumen rich froth collection stream 114, while first solid tailings stream 116 is pumped to a feed stream 118 of the second cyclone separation stage 108 where a further cyclone separation process is conducted. The bitumen froth 120 from the second cyclone separation stage 108 is reintroduced to the feed stream 100 supplying the first separation stage 106. The tailings stream 122 from the second cyclone separation stage 106 is combined with the water feed 104 to form a feed 124 to the third cyclone separation stage 110. The bitumen froth 126 from the third stage 110 is combined into the feed 118 to the second separation stage 108. The tailings from the third stage 110 form a first tailings stream 128, which may be pumped to a disposal site such as a tailings pond 149.

In the embodiment illustrated in FIG. 1, the three stage cyclone separation system incorporating a counter-current process and a water feed 104 results in a first flow 111 (dash-dot line in FIG. 1) of progressively enriched bitumen froth from the downstream cyclone separation stage 110 through the intermediate cyclone separation stage 108 to the upstream cyclone separation stage 106. At the same time, there is an opposite (counter-current) flow 113 (dotted line in FIG. 1) of mineral tailings from the upstream stage 106 to the intermediate stage 108, and finally to the downstream stage 110. In such a facility, effectively the hydro-transported ore slurry 100 is mixed with a counter-current wash of water to form bitumen froth stream 114 which is then drawn off and further processed to extract the desired hydrocarbons entrained therein. The counter-current water wash of the bitumen flow serves to improve the recovery efficiency of the bitumen. In this system, it will be understood that a three-stage process is preferred. However, it will be apparent to persons skilled in the art that the number of cyclone stages used in the process will also depend upon the grade of the ore supplied to the cyclone separation facility. Thus, a high grade ore may require fewer cyclone stages. Further, it will also be appreciated that the size or capacity of each cyclone stage will also be determinative of the number of stages required for a particular process. While wash water is shown being introduced at the downstream cyclone separation stage 110, it will be appreciated that wash water 104, or a portion thereof, can also be introduced at the other cyclone separation stages depending on the ore grade.

In addition, it will be understood that the cyclone separation facility is more efficient when operated in a water wash manner. The term "water wash" refers to the manner in which the slurry and water streams are supplied at opposite ends of a multi-stage process as discussed above. Thus, for example, water entering the process (either make-up or recycled) is first contacted with a bitumen-lean feed and vice versa.

A further advantage of the multi-stage cyclone separation facility illustrated in FIG. 1 lies in the fact that size of the component facility may be reduced since the multi-stage counter-current process results in a separation efficiency roughly equivalent to a much larger, single PSV stage system. For this reason, embodiments of the multi-stage facility of the present invention may be mounted on a mobile platform or on movable platforms and, in the result, such facility may be made moveable along with the oil sands mine face. However, the multi-stage cyclone separation facility may also be configured in a fixed arrangement.

In view of the comments above, the cyclone separation facility 102 illustrated in FIG. 1 is preferably an independently moveable facility where one desires to operate the facility as close to the oil sand mine face as possible. In such a case, the only stream requiring major transport comprises the bitumen froth stream 114 exiting from the cyclone separation facility, with tailings optionally deposited or stored close to the mine face. The cyclone separation facility removes the bulk of the solids from the ore slurry 100 at or close to the oil sand mining site thereby avoiding the need for transporting such material and the various costs associated therewith. Movement of the cyclone separation facility 102 may be accomplished by a mobile crawler (such as, for example, those manufactured by Lampson International LLC) or by providing driven tracks on the platform(s) supporting the separation stages. Various other apparatus or devices will be apparent to persons skilled in the art for achieving the required mobility.

Figure 2:
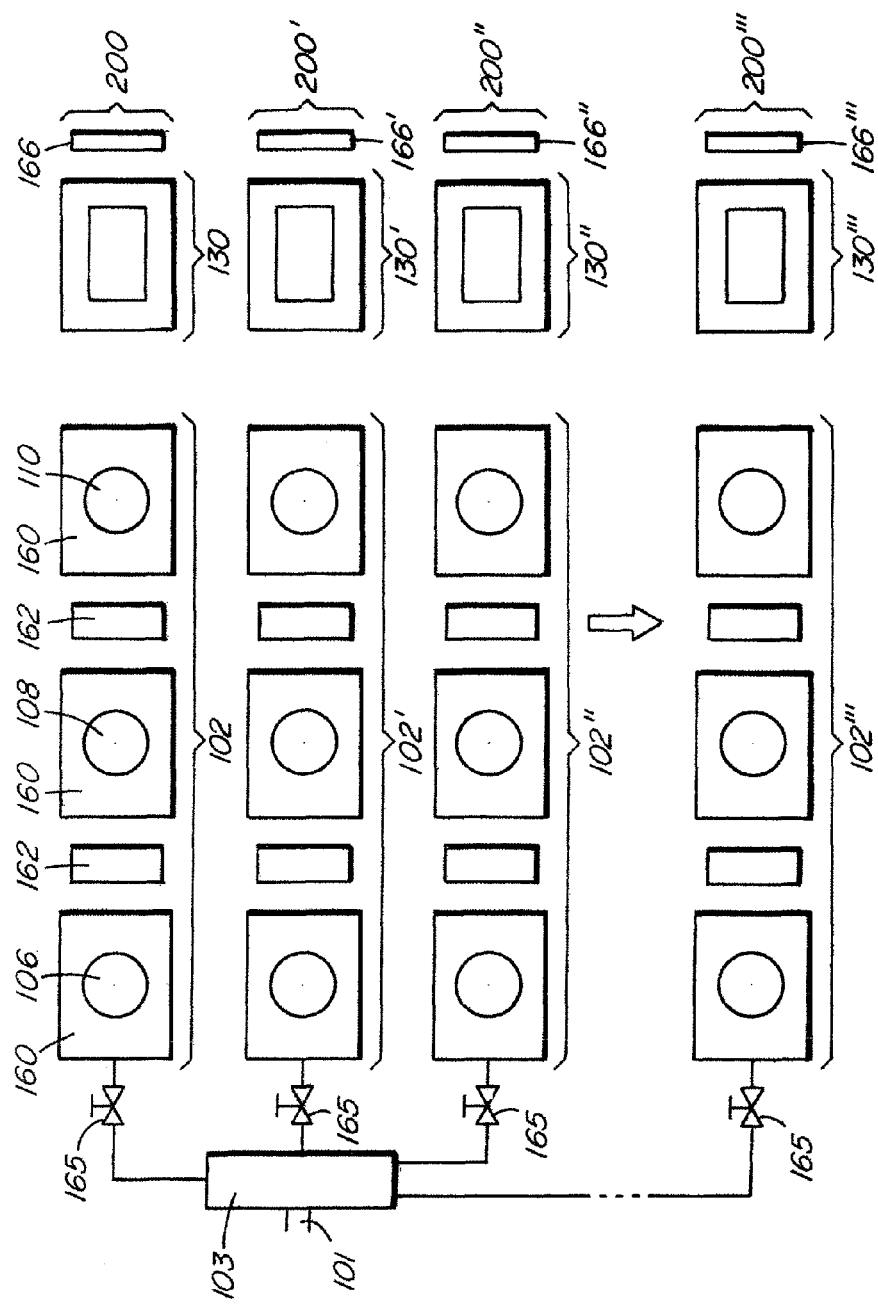
FIG. 2 is a schematic view showing a modular, mobile extraction system according to an aspect of the present invention incorporating a plurality of mobile cyclone separation stages forming a mobile cyclone separation facility and a mobile froth concentrator vessel defining a mobile froth concentration facility.

By way of example, FIG. 2 shows a preferred setup according to an aspect of the invention in which each cyclone separation stage 106, 108 and 110 is mounted on its own independent skid 160 to form a mobile module. Positioned between each cyclone separation stage skid 160 is a separate pump skid 162 which provides appropriate pumping power and lines to move the froth streams and solid tailings streams between the cyclone separation stages. It is also possible that any pumping equipment or other ancillary equipment can be accommodated on skid 160 with the cyclone separation stage. In the illustrated arrangement of FIG. 2, groups of three mobile modules are combinable together to form cyclone separation facilities 102, 102', 102" to 102" as needed. Also associated with each cyclone separation facility is a mobile froth concentration facility 130 which will be described in more detail below.

Each cyclone separation facility and associated froth concentration facility in combination define the smallest effective working unit 200 of the extraction system according to the illustrated embodiment. This modular arrangement of the extraction system provides for both mobility of the system and flexibility in efficiently handling of different volumes of ore slurry. For example, mobile modules comprising skids or other movable platforms with appropriate cyclone stage or froth concentration equipment on board may be assembled as needed to create additional mobile extraction systems 200', 200" to 200" to deal with increasing ore slurry flows provided by hydro-transport line 101. Ore slurry from the transport line 101 is fed to a manifold 103 which distributes the slurry to a series of master control valves 165. Control valves 165 control the flow of ore slurry to each mobile extraction system 200 to 200". This arrangement also permits extraction systems to be readily taken off-line for maintenance by switching flow temporarily to other systems.

The separation efficiency of the multi-stage counter-current cyclone separation facility allows the extraction system to be used with a variety of ores having different bitumen contents and solids contents. In the case of solids contents, both the mineral components and the fines components including silts and clays can vary. In one variation, it is possible for the cyclone separation facility to operate with a single cyclone separation stage or a pair of cyclone separation stages depending on the ore content, however, the three stage counter-current arrangement is the preferred arrangement for efficient separation over the widest range of ore grades.

The bitumen froth stream 114 obtained from the de-mineralizing cyclone separation facility 102 is unique in that it contains a higher water concentration than normally results in other separation facilities, that is, the present system creates a bitumen froth stream 114 (a bitumen-lean froth stream) that is more dilute than heretofore known. In known separation facilities, the resulting bitumen enriched stream typically has a bitumen content of about 60%, a solids content of approximately 10%, and a water content of approximately 30%. With the system and process according to an aspect of the present invention, however, sufficient water is added as wash water 104 to create a bitumen froth stream 114 having a bitumen content in the range of about 5-12% by weight, a solids content in the range of about 10-15% by weight and a water content of about 60-95% by weight. It will be understood that when the water content is in the higher concentrations (above about 85%) the bitumen content and solids content may be below about 5% and 10%, respectively. It will also be understood that the above concentrations are provided solely for illustrative purposes in one aspect of the present invention, and that in other variations various other concentrations will or can be achieved depending on various process parameters.

The present system and process create a highly diluted bitumen froth stream as a result of washing the froth stream in a counter-current manner with water stream 104 in order to improve bitumen recovery. The washing assists in the removal of solids in slurry 100. However, the increased water content of bitumen froth stream 114 necessitates that the bitumen froth stream be further processed in an additional step through a froth concentration facility 130 in order to remove the wash water. This ensures that the final bitumen enriched froth stream 136 of the present system is of a composition that can be delivered to a conventional froth treatment facility (not shown) which operates to increase the bitumen concentration of the product to make it ready for further processing in an upgrade or refinery facility.

Returning to FIG. 1, the bitumen froth stream 114 produced by the cyclone separation facility 102 is delivered to a froth concentration facility generally indicated at 130. More specifically, the froth stream 114 is preferably pumped to a froth concentrator vessel 132 within the froth concentration facility 130. Froth concentrator vessel 132 may comprise a flotation column, a horizontal decanter, a conventional separation cell, an inclined plate separator (IPS) or other similar device or system as will be known to persons skilled in the art. In one preferred embodiment, the froth concentration facility comprises at least one IPS unit. It will also be appreciated that the froth concentration facility 130 may comprise any number or combination of units. For example, in one embodiment, froth concentration facility 130 may comprise a separation cell and a flotation column arranged in series. In another embodiment, the froth concentration facility may comprise an IPS in association with a high rate thickener. In addition to the bitumen froth stream 114, an air feed 134 may also be pumped into the froth concentrator vessel 132 to assist in the froth concentration process. In general, however, sufficient air is entrained in the ore slurry during the hydro-transport process and in the froth stream during the cyclone separation step that addition of air is not warranted at the froth concentration step.

The froth concentrator vessels 132 described above tend to be suited to a froth concentration facility 130 according to an aspect of the invention that is intended to be fixed in place. This equipment does not tend to lend itself to being mobile when in operation due to its large size.

Within concentrator vessels 132, the froth is concentrated resulting in a final bitumen enriched froth or product stream 136 that may optionally be transported to a conventional froth treatment facility (not shown) to increase the bitumen concentration of the product to make it ready for further processing in an upgrader or refinery facility. The froth concentration facility 130 produces a fine solids stream 138 that comprises water and the fine solids (silt and clay) that were not separated at the cyclone separation facility 102. In one embodiment, chemical additives may also by used in the froth concentration facility 130 to enhance the separation of fine solids from the water.

The bitumen froth stream 114 that leaves the cyclone separation facility 102 contains bitumen at a concentration of about 5-12% by weight. As described above, this is a lean bitumen froth stream with a high water content. The froth concentration facility 130 is employed to increase the bitumen concentration in the final bitumen enriched froth stream 136 to about 55% to 60% by weight. When this final product of the extraction system is transported to a froth treatment facility (as mentioned above), the hydrocarbon concentration may be further increased to range from about 95% to 98% by weight. It should be noted that these concentrations are recited to exemplify the concentration process and are not meant to limit in any way the scope of any aspects of the present invention. It will be appreciated, for example, that the specific concentrations that can be achieved will depend on various factors such as the grade of the ore, the initial bitumen concentration, process conditions (i.e. temperature, flow rate etc.) and others.

In one aspect of the present invention, the froth concentration facility 130 is a mobile facility that is used in combination with the mobile cyclone separation facility 102 described above. As shown in FIG. 2, a froth concentration facility 130, 130', 130" to 130$^n$ is included in each mobile extraction systems 200', 200" to 200$^n$, respectively, to provide the necessary bitumen froth concentration step.

In order to meet the mobility arrangement for the froth concentration facility 130, a concentrator vessel specially designed for compactness may be used with the current extraction system. The preferred concentrator vessel for operation in a mobile facility is a modified version of a horizontal decanter. The modified design functions to efficiently process the lean bitumen froth stream exiting from the cyclone separation facility 102. The use of cyclone separation stages in the above described cyclone separation facility 102 allows the majority of the solids material (i.e. the mineral component) in the slurry to be removed. Such material is known to result in plugging of a device such as a horizontal decanter. However, since such material is removed by the cyclone separation facility, use of a horizontal decanter design is possible in the current system. As well, the horizontal decanter design lends itself well to modification to minimize the footprint of the concentrator vessel. This results in a preferred concentrator vessel having a configuration that is compact and readily movable, and therefore suited for incorporation into mobile embodiments of the present invention as described above and as illustrated schematically in FIG. 2.

Referring to FIGS. 3 to 7D, there are shown various embodiments of a froth concentrator vessel 132. Vessels according to this design have been found to reliably handle and process froth streams with a water content ranging from about 60-95% by weight, and with the majority of the solids content being fine solids with less than about 30% of the solids being of a particle size above about 44 microns. Such a froth stream composition is an example of a typical froth stream composition produced by cyclone separation facility 102 described above. However, the concentrator vessel 132 is not limited to handling froth streams with the above composition.

Figure 3:
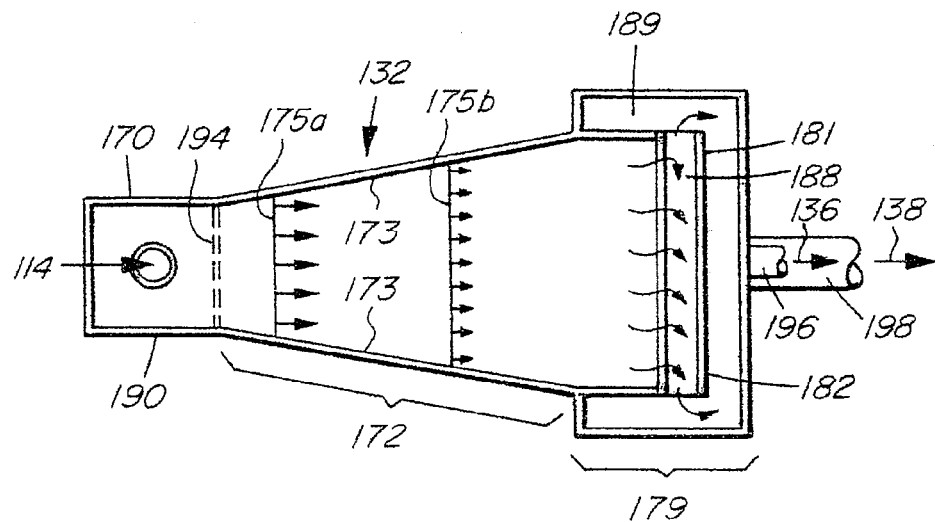
FIG. 3 is a top plan schematic view showing an embodiment of a froth concentrator vessel.
Figure 4:
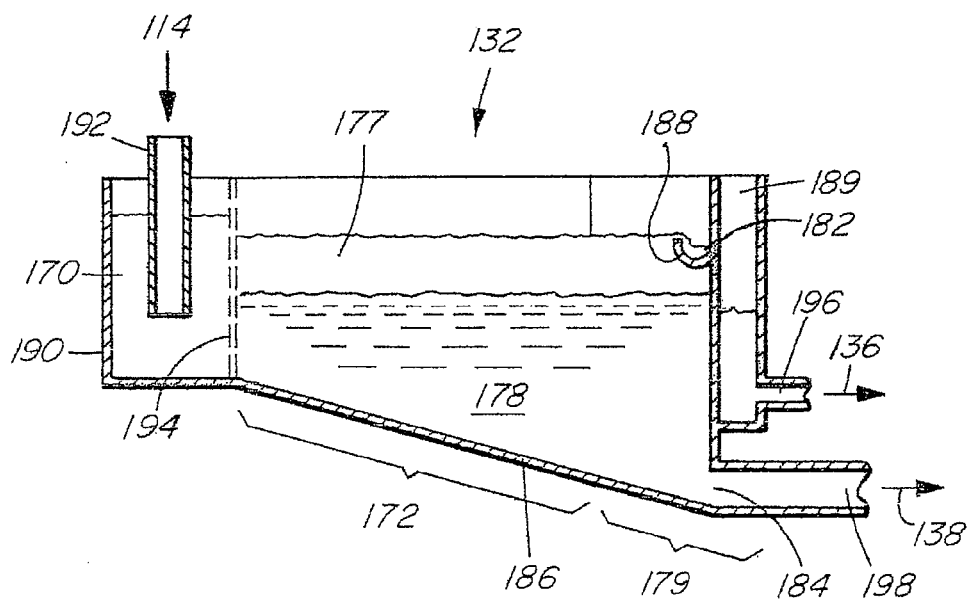
FIG. 4 is side elevation view of the concentrator vessel of FIG. 3.

FIGS. 3 and 4 are a schematic plan view and a side elevation view, respectively, of a concentrator vessel 132 showing major features to permit an understanding of the overall operation of the unit. The vessel includes an inlet region 170 to receive the bitumen froth stream 114 from cyclone separation facility 102. Inlet region 170 communicates with a separation region 172 where bitumen froth is concentrated by separation from the water and fine solids of the froth stream 114. Separation region 172 preferably comprises a diverging channel adapted to slow the flow of the bitumen froth stream 114 to promote vertical separation of the bitumen froth from the water and the fine solids due to gravity. As best shown in FIG. 3, the diverging walls 173 of the channel result in the velocity of the flow through the channel slowing due to there being an increasing area (wider channel) for the flow to move through. Arrows 175a show an initial velocity of flow volume through the channel at a time $t_1$ while arrows 175b show a slower flow velocity at a later time $t_2$ in a wider portion of the channel. In other words, the volumetric flow rate Q through the channel stays constant, however, the velocity slows as the area available for flow increases. As flow moves through the channel, gravity and the slowing of the flow causes bitumen froth to accumulate as an upper froth layer 177 atop a lower water layer 178 with fine solids settling within the water layer. This is best shown in the side elevation view of FIG. 4. The bitumen froth will tend to coalesce and float on the surface of what is primarily an aqueous flow (about 80% water by weight) and any remaining fine solids (silt and clay) in the stream will tend to settle within the water layer. The diverging channel of the separation region 172 terminates in a froth recovery region 179 which is formed with an overflow outlet 182 to collect the bitumen froth layer as a final bitumen froth stream 136. An underflow outlet 184 collects the water and fine solids stream 138.

Overflow outlet 182 preferably comprises at least one weir formed at a perimeter wall 181 of the froth recovery region 179. The weir can be a conventional crested weir or a J-weir 188 (as best shown in FIG. 4) so called because of its shape in cross-section. Overflow outlet 182 can be formed as a continuous weir about the full perimeter or a portion of the perimeter of the froth recovery region 179. Alternatively, overflow outlet 182 can comprise a plurality of crested weir or J-weir sections in the perimeter wall 181 of the froth recovery region 179. The number and positioning of the weirs about the perimeter of froth recovery region 179 will affect the volumetric flow through the concentrator vessel. Any overflow outlet 182 formed in froth recovery region 179 communicates with a froth launder 189 extending about the perimeter of the region that collects the weir overflow and delivers the final bitumen enriched froth stream 136 to a product nozzle 196. Similarly, underflow outlet 184 in perimeter wall 181 delivers water and fine solids stream 138 to a outflow nozzle 198.

As best shown in FIG. 4, the floor 186 of at least the separation region 172 and the froth recovery region 179 are inclined to promote flow through the concentrator vessel and to prevent fine solids from accumulating within the vessel.

FIG. 4 also shows a preferred arrangement for inlet region 170. The inlet region preferably includes conditioning means in the form of an enclosure 190 about an inlet pipe 192 for bitumen froth stream 114. The enclosure and inlet pipe are provided to promote a uniform velocity flow of the froth stream as the stream enters the separation region. Enclosure 190 and inlet pipe 192 serve to isolate the bitumen froth stream 114 entering the vessel at the inlet region 170 from the separation region 172 to avoid generation of turbulence in the separation region. The bitumen froth stream exits enclosure 190 through a baffle plate 194 which acts to establish substantially uniform velocity flow within the diverging channel.

Figure 5:
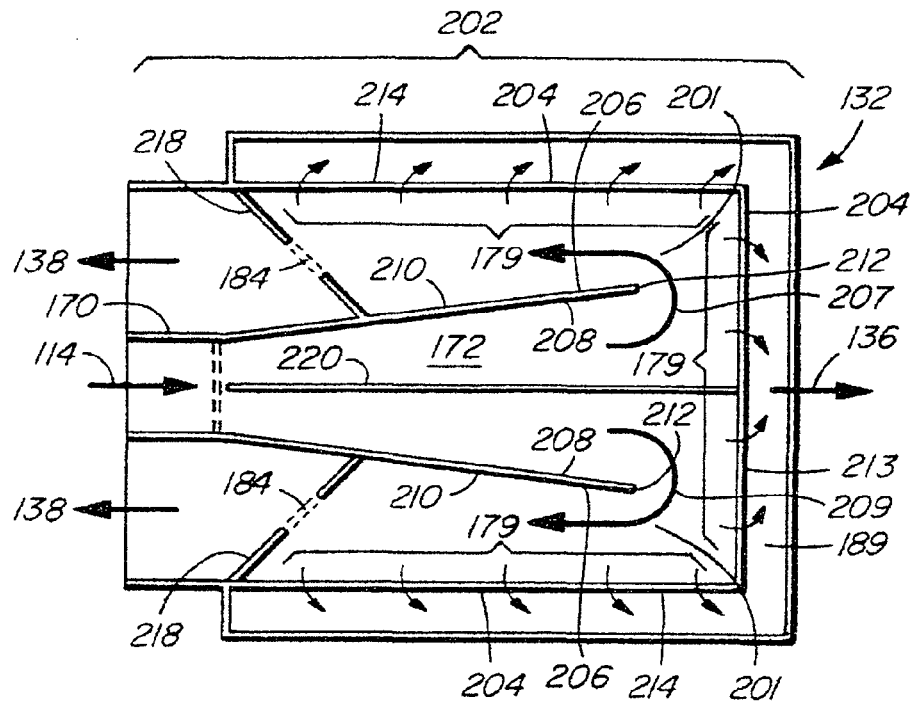
FIG. 5 is a top plan schematic view showing an alternative concentrator vessel incorporating a turn in the diverging channel.

FIG. 5 shows schematically in plan view an alternative embodiment of a concentrator vessel 132 for use with various embodiments of the system of the present invention. In FIG. 5, features that are common to the vessel of FIGS. 3 and 4 are labeled with the same reference number. The concentrator vessel of FIG. 5 differs from the vessel of FIGS. 3 and 4 primarily by virtue of the fact that the diverging channel defining the separation region 172 is formed with at least one turn 201 to increase the length of the channel and the region available for formation of the froth layer and settling of the fine solids material. Turn 201 may also serve to shorten the overall length dimension 202 of the concentrator vessel 132 to make the vessel more compact and suitable for a mobile role.

In the concentrator vessel embodiment of FIG. 5, there is an outer perimeter wall 204 and a floor which define a flow volume into which bitumen froth stream 114 is introduced after passing through inlet region 170. Diverging channel 172 is formed by at least one barrier within the outer perimeter wall. In the illustrated embodiment, the at least one barrier comprises a pair of diverging plates 206 that define a first section of the diverging channel 172 between opposed inner surfaces 208 of the plates, and a second section of the diverging channel after turn 201 between the outer surfaces 210 of the plates and the perimeter wall 204 of vessel. Turn 201 is formed between the ends 212 of the plates and the outer perimeter wall. In the embodiment of FIG. 5, the froth recovery region 179 is adjacent the outer perimeter wall of the flow volume. The pair of diverging plates 206 are positioned centrally adjacent inlet region 170 to form a central diverging channel which divides into two channels at turns 201 on opposite sides of the flow volume. At turn 201, flow from the first section of diverging channel 172 is split into two separate flows with each flow reversing course through substantially 180 degrees toward inlet region 170 in the second section of the diverging channels as shown by arrows 207 and 209 in FIG. 5. This reversing of the flow at each turn 201 requires slowing and turning of the flow which provides additional opportunity for the bitumen froth layer to form on the water layer of the flow. End wall section 213 is therefore formed with an overflow outlet in the form of an overflow weir that empties into launder 189 for collection and recovery of the separated froth. Side wall sections 214 of the perimeter wall define additional froth recovery regions. One or more additional overflow outlets for bitumen froth into launder 189 may be formed in side wall sections 214. The overflow outlets of the side wall or end wall sections may be the crest weir or J-weir arrangements previously described in the discussion of FIG. 4 or a combination of both. The use of end wall section 213 and side wall sections 214 to provide overflow outlets for the enriched bitumen froth provides an opportunity to collect the bitumen enriched froth product in stages so that the product is recovered as it is produced. This minimizes "slip"

between the froth layer and the underlying water layer which is important to avoid bitumen being entrained back into the water layer. The enriched bitumen froth collected in launder 189 exits from the launder as final product stream 136.

The concentrator vessel 132 of FIG. 5 may also include an inclined floor formed in the separation region and the froth recovery region to induce flow from the inlet region to the overflow and underflow outlets. The inclined floor of the flow chamber provides a path for collection of rejected water and fine solids and enhances removal of these components without re-entrainment of the bitumen froth layer. An underflow outlet 184 in each end wall section 218 of the perimeter wall collects the combined water and fine solids stream which is discarded as stream 138.

The concentrator vessel 132 of FIG. 5 optionally includes a central barrier 220 extending between the pair of diverging barriers 208 to form a pair of diverging channels adjacent the inlet region.

Figure 6:
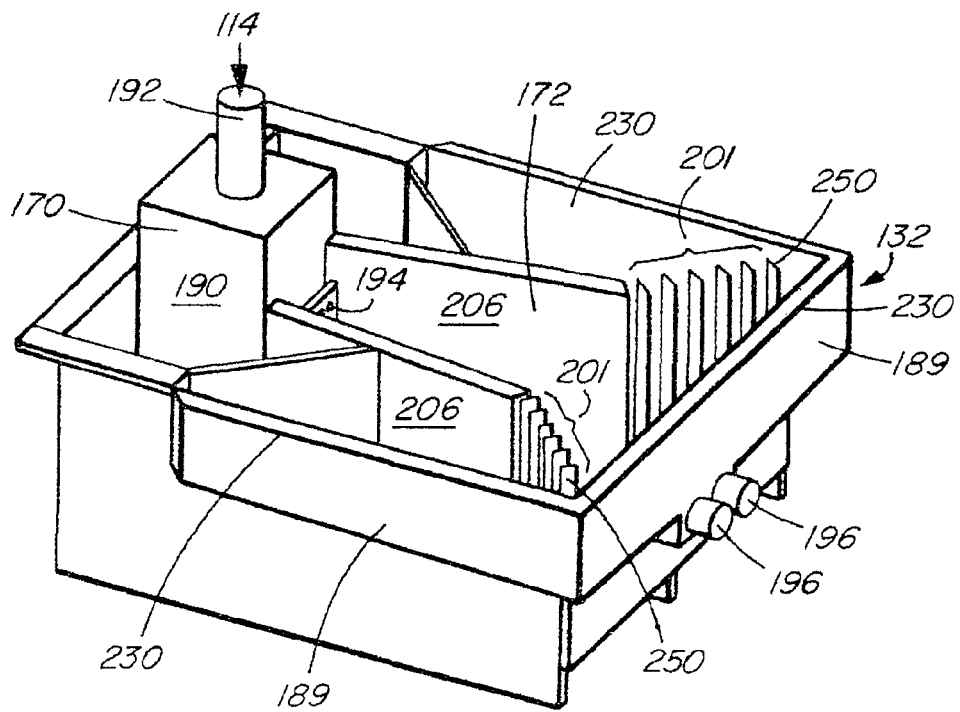
FIG. 6 is a perspective view of a concentrator vessel according to another embodiment.
Figure 7:
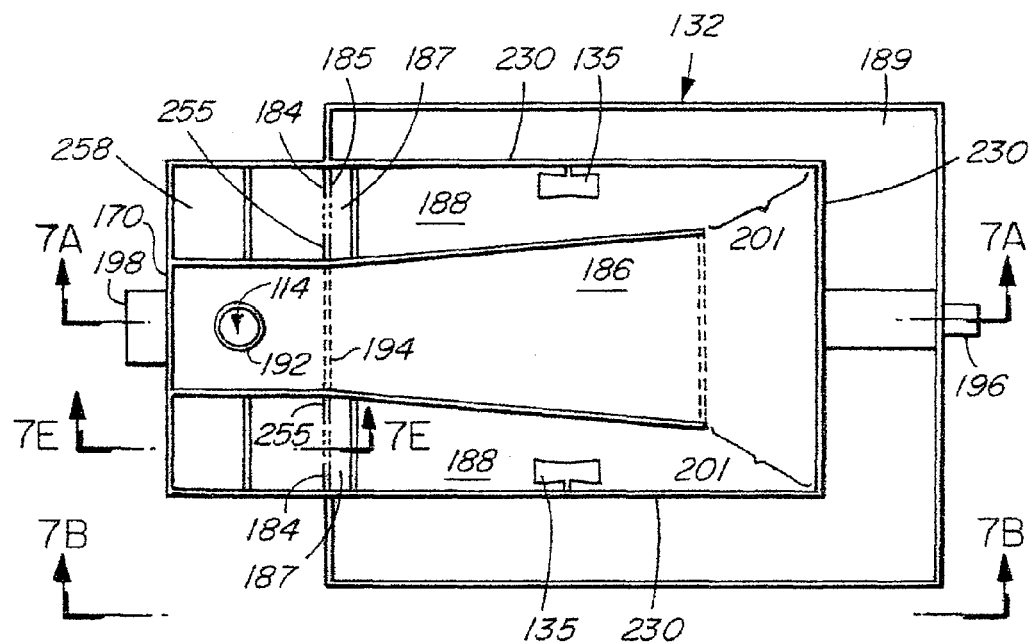
FIG. 7 is a top plan view of a concentrator vessel according to a further embodiment.
Figure 7E:
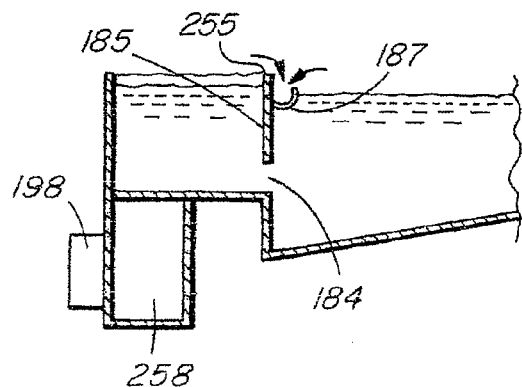
FIG. 7E is a detail section view taken along line 7E-7E of FIG. 7 showing details of a froth recovery weir to collect froth discharged through the underflow outlet.
Figure 7A:
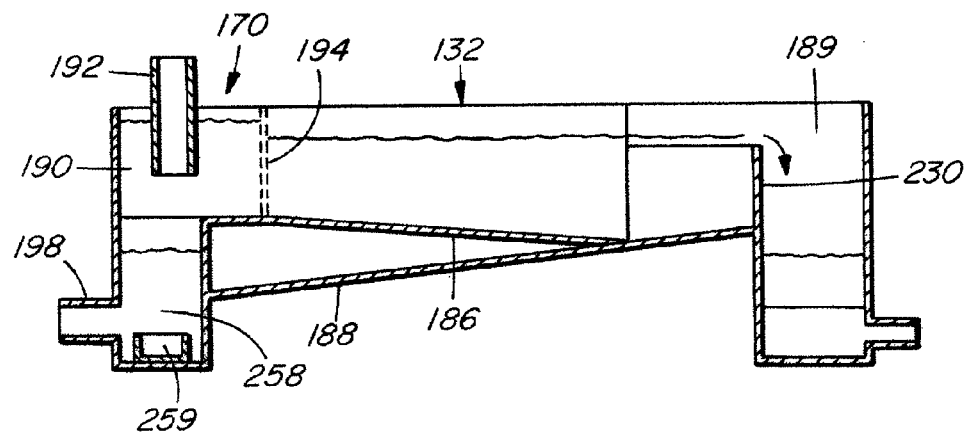
FIG. 7A is a cross-sectional elevation view taken along line 7A-7A of FIG. 7.
Figure 7B:
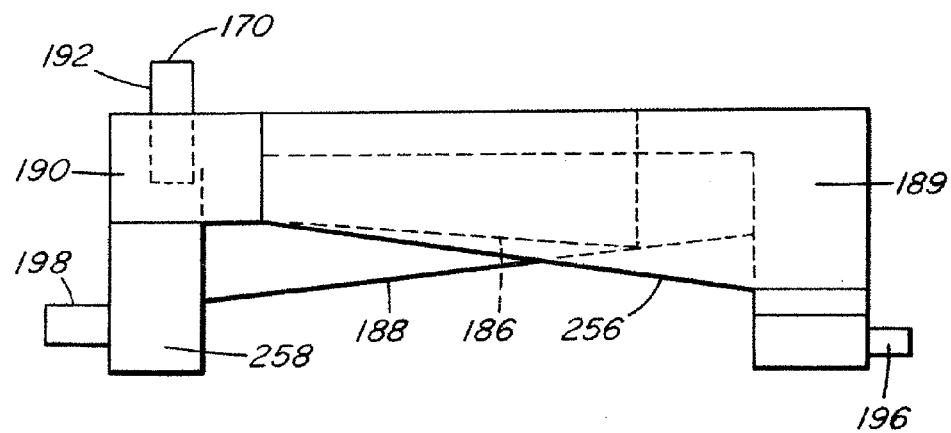
FIG. 7B is a side elevation view taken along line 7B-7B of FIG. 7.
Figure 7C:
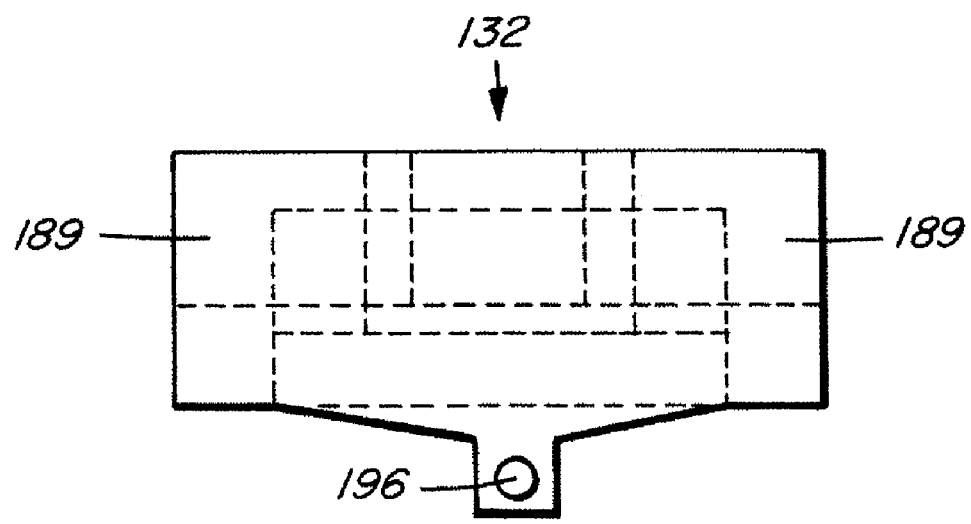
FIG. 7C is an end view of the concentrator vessel of FIG. 7 showing the overflow outlet end and the bitumen froth exit nozzle.
Figure 7D:
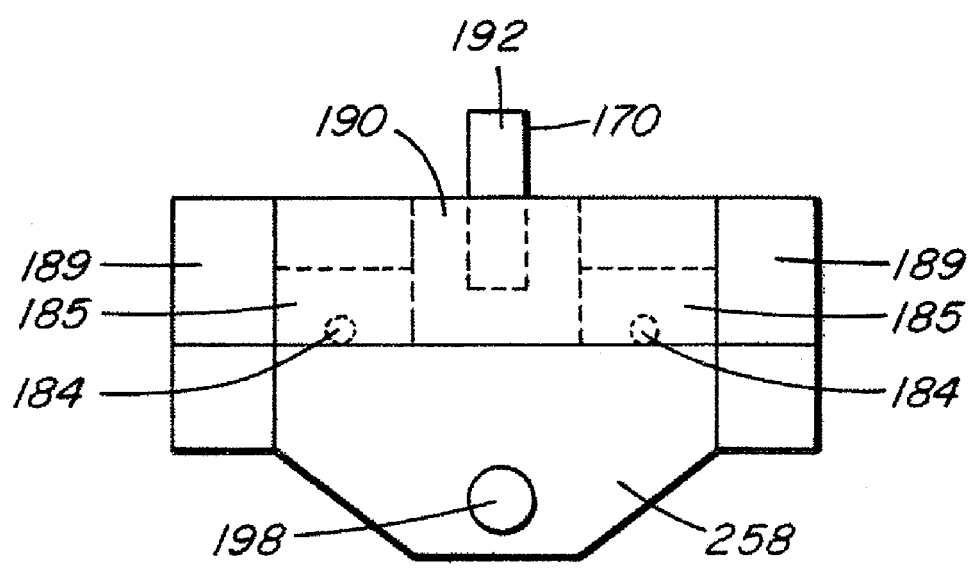
FIG. 7D is an opposite end view of the concentrator vessel of FIG. 7 showing the underflow outlet end and the water and fine solids exit nozzle.

FIGS. 6 to 7D show perspective and orthographic views of concentrator vessels constructed according to the design features discussed above. In each embodiment, inlet region 170 is formed with an enclosure 190 and baffle plate 194 to prevent turbulent flow created when bitumen froth stream 114 is delivered into the inlet region by inlet pipe 192 from disturbing the flow in diverging channel 172. Flow exits the inlet region through baffle plate 194 which tends to establish substantially uniform velocity flow within the diverging channel 172. As best shown in FIG. 7A, which is a cross-sectional view taken along line 7A-7A of FIG. 7, and FIG. 7B, which is a side elevation view taken along line 7B-7B of FIG. 7, the floor 186 of diverging channel 172 defining the first separation region before turn 201 and the floor 188 of the second separation region after turn 201 are sloped to promote flow through the concentrator vessel and to ensure that fine solids that settle in the water layer continue to be transported along the sloped floor by gravity towards the underflow outlets 184. By way of example, floors 186 and 188 may have a slope of about 3-3.5%, but other inclines are also possible.

Adjacent perimeter walls 230 is the froth recovery region of the concentrator vessels. Perimeter walls 230 are formed with overflow outlets in the form of crested weirs or J weirs to allow the bitumen enriched froth layer collecting atop the water layer to overflow from the concentrator vessel into froth launder 189. As best shown in FIG. 7B, froth launder 189 is formed with a sloped floor 256 that delivers the collected bitumen enriched froth to one or more product nozzles 196. FIG. 7C, which is an end view of the concentrator vessel, shows product nozzle 196 at a low point in the launder to ensure efficient collection of the bitumen enriched froth stream.

At the opposite end of the concentrator vessel, the water and fine solids stream exits the concentrator vessel through underflow outlets 184 formed in end walls 185 of the discharge channels. End walls 185 are preferably formed with a J weir 187 to collect bitumen froth at the end of the discharge channel. The rejected water and fine solids stream is collected in a discharge section 258 and discharged through outflow nozzle 198. As best shown FIG. 7D, which is an end view of the concentrator vessel, the discharge section is formed with a sloped floor and outflow nozzle 198 is at a low point in discharge section. Discharge section 258 preferably includes a removable solids clean out box 259 (best shown in FIG. 7A) so that any fine solids that accumulate in the discharge section can be periodically removed.

Figure 8:
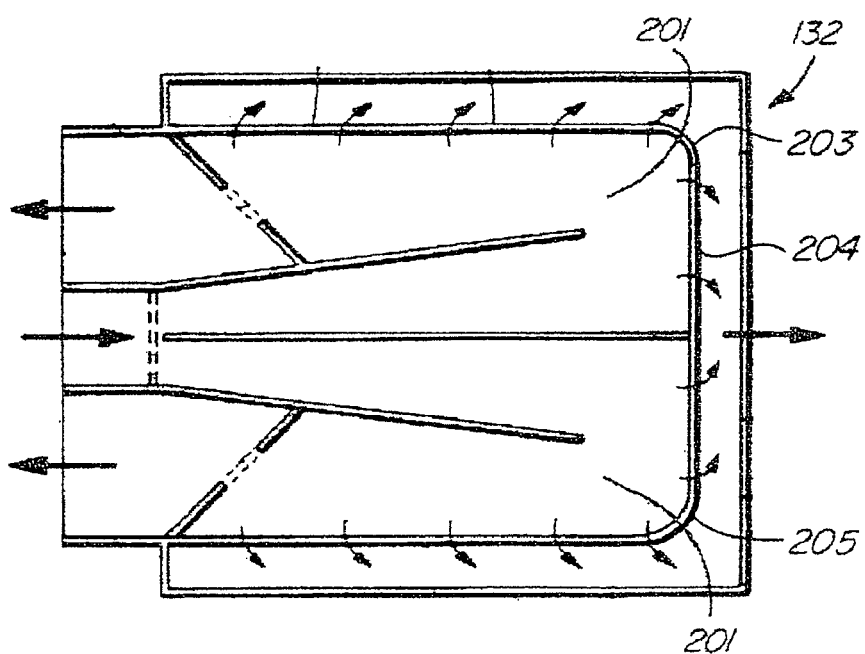
FIG. 8 is a top plan schematic view showing an alternative concentrator vessel incorporating rounded corners and a turn in the diverging channel.

As shown in the embodiment of FIG. 6, the concentrator vessel 132 may optionally include flow re-direction means in the form of vanes 250 to promote smooth flow through turns 201 in the diverging channels. Vanes 250 are adapted to re-direct the flow through turns 201 to maintain smooth flow lines and prevent mixing of the flow through turns 201. Alternatively, referring to FIG. 8, the flow re-direction means may also comprise rounded corners 203 and 205 formed in the outer perimeter wall 204 of the flow volume to promote smooth, non-mixing flow through turns 201.

The concentrator vessel embodiment of FIG. 7 includes a froth layer flow enhancement means to prevent formation of stagnant regions in the froth layer. In the illustrated embodiment, the froth layer flow enhancement means takes the form of a rotatable paddle element 135 (shown in FIG. 7), which is operated to urge the froth layer into movement in any stagnant zones that may develop so as to urge the froth layer toward an overflow outlet.

In some situations, bitumen froth may become entrained in the rejected water and fine solids flow that exits the concentrator vessel through underflow outlets 184. To address this issue, a weir may be provided in the discharge section 258, the weir being adapted to permit any bitumen froth that exits the underflow outlet and collects atop the water layer in the discharge section to overflow back into the froth launder. An example of such an arrangement is best shown in FIG. 7E which is a detail view taken along line 7E-7E. The top of end wall 185 defines a weir 255 which allows any bitumen froth that rises to the surface of the underflow water to overflow into J weir 187 on the opposite side of the end wall for delivery to the froth launder.

Referring back to FIG. 1, in a further embodiment of the system of the present invention, the water and fine solids stream 138 produced by froth concentration facility 130 is diverted to an optional water recovery facility 140 which separates the fine solids stream 138 into a water stream 142 and a concentrated fine solids stream 144. The fine solids stream 144 is preferably combined with the solids stream 128 produced by the cyclone separation facility 102. As shown in FIG. 1, water stream 142 may be recycled into the water feed 104 that is supplied to the cyclone separation facility 102. Water recovery facility 140 may include any known equipment 141 for separating water from solids such as, for example, a thickener or a cyclone stage. Preferably, water recovery equipment 141 is specifically designed to separate small sized solids particles (silt and clay) since much of the larger sized solid particles have been removed upstream in the cyclone separation facility 102. The most appropriate equipment for this step will often be a high gravity cyclone unit. Removal of fine solids from water stream 142 avoids the accumulation of the such solids within the system and permits recycling of the water. Water recovery facility 140 is preferably mobile and may comprise a water recovery unit mounted on its own independently movable platform 166 (see FIG. 2) or incorporated into the same movable platform as froth concentration facility 130.

The slurry 100 that is fed to cyclone separation facility 102 is generally formed using heated water. In conventional bitumen extraction equipment such as primary separation vessels (PSV), where bubble attachment and flotation are used for bitumen extraction, temperature can affect the efficiency of the extraction process. In embodiments of the present invention, the extraction process is not as temperature sensitive since the cyclone equipment provides solid/liquid separation based on rotational effects and gravity. Extraction efficiency tends to be maintained even as temperature drops making the cyclone extraction process more amendable to lower temperature extraction. This has energy saving implications at the cyclone separation facility 102 where wash water feed 104 or recycled water stream 140 do not have to be heated to the same extent as would otherwise be necessary to maintain a higher process temperature.

In a further aspect of the present invention, as shown in FIG. 1, the cyclone separation stage 102 may optionally be provided with a "scalping" unit shown at 146. The scalping unit 146 may comprise, for example, a pump box or the like which serves to remove any froth formed in the slurry feed 100 during the hydro-transport process. It will be appreciated that removal of such bitumen rich froth further increases the recovery efficiency of the three-stage counter-current separation stages. The froth stream 148 generated by the scalping unit 146 is combined into the froth stream 114 resulting from the cyclone separation facility 102. The remaining slurry from the scalping unit 146 then comprises the feed 150 to the cyclone separation facility. As illustrated in FIG. 1, if a scalping unit 146 is used, the froth stream 120 from the second cyclone separation stage 108 is fed downstream of the scalping unit 146.

In a further optional embodiment, the ore slurry 100 may be provided with any number of known additives such as frothing agents and the like prior to being fed to the cyclone separation stage 102. An example of such additives is provided in U.S. Pat. No. 5,316,664. As mentioned above, the solids components stream 128 shown in FIG. 1 is transported to a tailings disposal site 149. In a preferred embodiment, the solids stream (which may comprise solely the solids component stream 128 from the cyclone facility 102 or a combined solids stream including the fine solids stream 144 from the water recovery unit 140) is pumped to a tailings pond where the solids are allowed to settle thereby allowing the water to be drawn off. In one embodiment, a rheology modifier or other such additive may be added to the solids stream in order to enhance settlement of the solids material. An example of such an additive is described in PCT publication WO/2004/9698 19 to Ciba Specialty Chemicals Water Treatments Limited. The solids stream may be passed through various known equipment such as belt filters, stacking cyclones and the like prior to deposit into tailings disposal site 149.

Throughout the above discussion, various references have been made to pumping, transporting, conveying etc. various materials such as slurries, froth and tailings and others. It will be understood that the various equipment and infrastructure such as pumps, conveyor belts, pipelines etc. required by these processes will be known to persons skilled in the art and, therefore, the presence of such elements will be implied if not otherwise explicitly recited.

Although the present invention has been described in some detail by way of example for purposes of clarity and understanding, it will be apparent that certain changes and modifications may be practiced within the scope of the appended claims.

We claim:

1. An extraction system for extracting bitumen from a slurry containing bitumen, solids and water comprising:
    a cyclone separation facility for separating the slurry into a solids component stream and a bitumen froth stream, the bitumen froth stream including bitumen, water and fine solids; and
    a froth concentration facility for separating the bitumen froth stream into a final bitumen enriched froth stream, and a water and fine solids stream, the froth concentration facility comprising at least one concentrator vessel having:
        an inlet region to receive the bitumen froth stream;
        a separation region in communication with the inlet region comprising a laterally diverging channel adapted to slow the flow of the bitumen froth stream to promote separation of the bitumen froth from the water and the fine solids, the bitumen froth accumulating as a separated bitumen froth layer atop a water layer with the fine solids settling within the water layer; and
        a froth recovery region in communication with the separation region having an overflow outlet to collect the separated bitumen froth layer as the final bitumen enriched froth stream, and an underflow outlet to collect the water and fine solids stream,
    wherein the laterally diverging channel is formed by first and second spaced apart continuous barriers, each of the first and second spaced apart continuous barriers extending from respective first ends disposed proximate the inlet region to second ends disposed proximate the froth recovery region, the laterally diverging channel having a first region between the respective first ends of the first and second spaced apart continuous barriers and a second region between the respective second ends of the first and second spaced apart continuous barriers, the second region being wider than the first region to cause the flow of the bitumen froth stream to be slowed while a volumetric flow rate through the laterally diverging channel remains constant as the bitumen froth stream is directed from the inlet region to the froth recovery region between the first and second spaced apart continuous barriers.

2. The system of claim 1 wherein the cyclone separation facility comprises at least three cyclone separation stages arranged in a counter-current flow configuration, the at least three cyclone separation stages including at least an upstream separation stage and a downstream separation stage, wherein the slurry is fed to the upstream separation stage and water is fed from a water supply to the downstream separation stage.

3. The system of claim 1 in which the at least one concentrator vessel comprises a plurality of concentrator vessels, and each concentrator vessel is a mobile module, the mobile modules being combinable to form a mobile froth concentration facility.

4. The system of claim 3 in which the froth concentration facility is movable independently of the cyclone separation facility.

5. The system of claim 1 in which the inlet region of the at least one concentrator vessel includes conditioning means to promote a uniform velocity flow of the froth stream as the stream enters the separation region.

6. The system of claim 5 in which the conditioning means comprise an enclosure to isolate the bitumen froth stream entering the vessel at the inlet region from the separation region to avoid generation of turbulence in the separation region, the bitumen froth stream exiting the enclosure through a baffle plate configured to establish the uniform velocity flow and to cause the separated bitumen froth layer to move generally in the same direction as the water layer and the fine solids at least until the separated bitumen froth is collected at the overflow outlet.

7. The system of claim 5 or 6 in which the laterally diverging channel includes at least one turn to increase the length of the channel, the laterally diverging channel having a first section located before the at least one turn and a second section located after the at least one turn.

8. The system of claim 7 in which the inlet region communicates with a flow volume enclosed by an outer perimeter wall and a floor, the laterally diverging channel being defined within the outer perimeter wall, the first spaced apart continuous barrier terminating a distance from the outer perimeter wall to form the at least one turn in the channel between the end of the first spaced apart continuous barrier and the outer perimeter wall, the froth recovery region being adjacent the outer perimeter wall of the flow volume, wherein the first section is formed between inner surfaces of the first and second spaced apart continuous barriers and extending from between the first ends of the first and second spaced apart continuous barriers to between the second ends of the first and second spaced apart continuous barriers, and the second section is formed between surfaces of the second spaced apart continuous barrier and the outer perimeter wall and extending from between the second end of the second spaced apart continuous barrier and a first corresponding portion of the outer perimeter wall to between the first end of the second spaced apart continuous barrier and a second corresponding portion of the outer perimeter wall, the second spaced apart continuous barrier being further apart from the perimeter wall at the first end than at the second end of the second spaced apart continuous barrier.

9. The system of claim 8 in which the laterally diverging channel is disposed centrally within the flow volume, each of the first and second spaced apart continuous barriers terminating a distance from the perimeter wall to form first and second turns in the channel whereby the laterally diverging channel divides into two diverging channels formed at opposite sides of the flow volume between each of the first and second spaced apart continuous barriers and portions of the outer perimeter wall adjacent respective ones of the first and second spaced apart continuous barriers.

10. The system of claim 9 further including a central wall disposed between the first and second spaced apart continuous barriers to form a pair of laterally diverging channels adjacent the inlet region.

11. The system of claim 7 including flow re-direction means to promote smooth flow through the at least one turn.

12. The system of claim 11 in which the flow re-direction means comprise generally vertically disposed vanes adapted to re-direct the flow through the at least one turn and to prevent mixing of the flow through the at least one turn.

13. The system of claim 11 in which the flow re-direction means comprises rounded corners formed in the outer perimeter walls of the flow volume.

14. The system of claim 7 in which the at least one turn is through substantially 180 degrees such that the flow in the first section of the laterally diverging channel occurs in a generally opposite direction to the flow in the second section of the laterally diverging channel.

15. The system of any one of claims 5 to 6 in which the concentrator vessel includes froth layer flow enhancement means to prevent formation of stagnant regions in the froth layer.

16. The system of claim 15 in which the froth layer flow enhancement means comprises a rotatable paddle element.

17. The system of claim 1 in which the overflow outlet comprises at least one weir formed at a perimeter of the froth recovery region.

18. The system of claim 17 in which the at least one weir comprises a weir having a generally J-shaped profile.

19. The system of claim 17 in which the overflow outlet communicates with a froth launder operative to collect the final bitumen froth stream and deliver the final bitumen enriched froth stream to a product nozzle configured to discharge the final bitumen enriched froth stream from the at least one concentrator vessel.

20. The system of claim 19 in which the froth launder extends about the perimeter of the froth recovery region.

21. The system of any one of claim 1, 2, 3, 4, 5, or 6 in which at least the separation region and the froth recovery region include a floor inclined to create flow from the inlet to the overflow and underflow outlets and to prevent fine solids from accumulating within the vessel.

22. The system of claim 19 including a weir adapted to permit any bitumen froth that exits the underflow outlet to overflow into the froth launder.

23. The system of any one of claim 1, 2, 3, 5, 6, 17, 18, or 20 further comprising a water recovery facility for separating the water and fine solids stream from the froth concentration facility into a water stream and a fine solids stream.

24. The system of claim 23 wherein the water stream from the water recovery facility is recycled to the cyclone separation facility.

25. The system of claim 24 wherein the water recovery facility comprises at least one water separation unit selected from the group consisting of a cyclone stage and a thickener.

26. The system of any one of claim 1, 2, 3, 5, 6, 17, 18, or 20 further comprising a scalping unit to remove bitumen rich froth from the slurry prior to entering the cyclone separation facility.

27. The system of any one of claim 1, 2, 3, 5, 6, 17, 18, or 20 further comprising a screening and comminuting unit to screen and re-size solids particles from the slurry that exceed a pre-determined size prior to entering the cyclone separation facility.

28. The system of claim 2 in which the at least three cyclone separation stages further include at least one intermediate separation stage and each of the at least three cyclone separation stages has an overflow and an underflow and wherein:
 a final bitumen froth stream is formed from the overflow of the upstream separation stage;
 a solids component stream is formed from the underflow of the downstream separation stage;
 the overflow of the downstream stage is fed to the at least one intermediate separation stage;
 the overflow of the at least one intermediate stage is fed to the upstream separation stage; and
 the underflow of the at least one intermediate separation stage is fed to the downstream separation stage.

29. The system of claim 28 further comprising a dewatering unit for separation of the water and fine solids stream into a water stream and a fine tailings stream comprising dewatered fine tailings.

30. The system of claim 29 wherein the water stream is recycled to the water supply.

31. The system of claim 29 wherein the fine tailings stream is combined with the solids component stream.

32. A bitumen extraction system comprising:
 a cyclone separation facility having a counter-current configuration for processing a bitumen-lean slurry containing bitumen, solids and water, the bitumen-lean slurry having a bitumen content of less than about 15% by weight, the cyclone separation facility operable to separate the bitumen-lean slurry into a solids component stream and a bitumen-lean froth stream, the bitumen-lean froth stream including water and fine solids and the bitumen-lean froth stream further having a bitumen content of about 5 to about 12% by weight; and
a froth concentration facility for separating the bitumen-lean froth stream into a bitumen-enriched froth stream, and a water and fine solids stream, the bitumen-enriched froth stream having a bitumen content of at least about 55% by weight, the froth concentration facility comprising at least one concentrator vessel having:
 an inlet region to receive the bitumen froth stream;

a separation region in communication with the inlet region comprising a laterally diverging channel adapted to slow the flow of the bitumen froth stream to promote separation of the bitumen froth from the water and the fine solids, the bitumen froth accumulating as a froth layer atop a water layer with the fine solids settling within the water layer; and a froth recovery region in communication with the separation region having an overflow outlet to collect the separated bitumen froth layer as a final bitumen enriched froth stream, and an underflow outlet to collect the water and fine solids stream;

wherein the laterally diverging channel is formed by first and second spaced apart continuous barriers, each of the first and second spaced apart continuous barriers extending from respective first ends disposed proximate the inlet region to second ends disposed proximate the froth recovery region, the laterally diverging channel having a first region between the respective first ends of the first and second spaced apart continuous barriers and a second region between the respective second ends of the first and second spaced apart continuous barriers, the second region being wider than the first region to cause the flow of the bitumen froth stream to be slowed while a volumetric flow rate through the laterally diverging channel remains constant as the bitumen froth stream is directed from the inlet region to the froth recovery region between the first and second spaced apart continuous barriers.

33. A bitumen extraction system comprising:
(a) a cyclone separation facility for separating a bitumen-lean slurry having less than about 15% by weight bitumen, at least about 40% by weight solids and at least about 30% by weight water, into a solids component stream and a bitumen-lean froth stream, the bitumen-lean froth stream including water and fine solids and the bitumen-lean froth stream further having a bitumen content of about 5 to about 12% by weight; the cyclone separation facility comprising:
  (i) an upstream cyclone separation stage operative to separate the bitumen-lean slurry into the bitumen-lean froth stream and a first solids tailings stream;
  (ii) an intermediate cyclone separation stage operative to separate the first solids tailings stream into a second bitumen froth stream and a second solids tailings stream, the intermediate cyclone separation stage in fluid communication with the upstream cyclone separation stage to feed the second bitumen froth stream to the upstream cyclone separation stage; and
  (iii) a downstream cyclone separation stage operative to separate the second solids tailings stream into a third bitumen froth stream and a third solids tailings stream; and
(b) a froth concentration facility for separating the bitumen-lean froth stream into a bitumen-enriched froth stream, and a water and fine solids stream, the bitumen-enriched froth stream having a bitumen content of at least about 55% by weight, the froth concentration facility comprising at least one concentrator vessel having:
an inlet region to receive the bitumen froth stream;
a separation region in communication with the inlet region comprising a laterally diverging channel adapted to slow the flow of the bitumen froth stream to promote separation of the bitumen froth from the water and the fine solids, the bitumen froth accumulating as a froth layer atop a water layer with the fine solids settling within the water layer; and a froth recovery region in communication with the separation region having an overflow outlet to collect the separated bitumen froth layer as a final bitumen enriched froth stream, and an underflow outlet to collect the water and fine solids stream;

wherein the laterally diverging channel is formed by first and second spaced apart continuous barriers, each of the first and second spaced apart continuous barriers extending from respective first ends disposed proximate the inlet region to second ends disposed proximate the froth recovery region, the laterally diverging channel having a first region between the respective first ends of the first and second spaced apart continuous barriers and a second region between the respective second ends of the first and second spaced apart continuous barriers, the second region being wider than the first region to cause the flow of the bitumen froth stream to be slowed while a volumetric flow rate through the laterally diverging channel remains constant as the bitumen froth stream is directed from the inlet region to the froth recovery region between the first and second spaced apart continuous barriers.

34. The system of claim 1 wherein the first and second spaced apart continuous barriers are generally vertical spaced apart barriers.

35. The system of claim 1 wherein the inlet region further comprises an inlet pipe configured to receive the bitumen froth stream, the inlet pipe disposed such that the bitumen froth stream is received at the inlet pipe at a higher altitude than the final bitumen enriched froth stream exiting the overflow outlet and at a higher altitude than the water and fine solids stream exiting the underflow outlet to cause vertical separation of the bitumen froth from the water and fine solids due to gravitational forces acting upon the bitumen froth stream as the bitumen froth stream moves from the inlet pipe to the overflow and underflow outlets.

36. The system of claim 1 further comprising an underflow discharge nozzle configured to discharge the water and fine solids stream collected at the underflow outlet, the underflow discharge nozzle located at a low point of the froth recovery region.

37. The system of claim 36 wherein the underflow discharge nozzle comprises a plurality of underflow discharge nozzles, each of said plurality of underflow discharge levels located at the low point of the froth recovery region.

38. The system of claim 19 wherein the product nozzle is disposed at a low point of the froth launder such that the final bitumen froth stream is discharged from the at least one concentrator vessel at a lower altitude than at which the separated bitumen froth layer is collected at the overflow outlet.

39. The system of claim 8 further comprising an end wall section located in the second section between the first end of the second spaced apart continuous barrier and the outer perimeter wall, the underflow outlet located at a low point of the end wall section.

40. The system of claim 21 wherein the floor is inclined to have a slope between about 3% to about 3.5%.

* * * * *

UNITED STATES PATENT AND TRADEMARK OFFICE
CERTIFICATE OF CORRECTION

| | | |
|---|---|---|
| PATENT NO. | : 8,096,425 B2 | Page 1 of 1 |
| APPLICATION NO. | : 11/595817 | |
| DATED | : January 17, 2012 | |
| INVENTOR(S) | : Bradford E. Bjornson et al. | |

It is certified that error appears in the above-identified patent and that said Letters Patent is hereby corrected as shown below:

At column 10, line 54, after "flow." please insert --End wall section 213 of perimeter wall 204 where the flow reverses tends to create a stagnant zone defining a portion of the froth recovery region for the present vessel for removal of the accumulated bitumen froth layer.--.

Signed and Sealed this
Eighteenth Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,096,425 B2 | Page 1 of 1 |
| APPLICATION NO. | : 11/595817 | |
| DATED | : January 17, 2012 | |
| INVENTOR(S) | : Bradford E. Bjornson et al. | |

It is certified that error appears in the above-identified patent and that said Letters Patent is hereby corrected as shown below:

In the Specifications:

At column 8, line 19, please change "by" to --be--.

Signed and Sealed this
Thirtieth Day of April, 2013

Teresa Stanek Rea
*Acting Director of the United States Patent and Trademark Office*